United States Patent [19]

Cowell

[11] Patent Number: 4,839,501

[45] Date of Patent: Jun. 13, 1989

[54] CARTRIDGE SOLDERING IRON

[75] Inventor: Mark J. Cowell, San Carlos, Calif.

[73] Assignee: Metcal, Inc., Menlo Park, Calif.

[21] Appl. No.: 904,298

[22] Filed: Sep. 8, 1986

[51] Int. Cl.$^4$ .............................................. B23K 3/06
[52] U.S. Cl. .................................. 219/237; 219/236; 219/240; 219/229; 219/230
[58] Field of Search ............... 219/227, 223, 229, 230, 219/231, 236, 237, 238, 239, 240, 241; 228/51-55

[56] References Cited

U.S. PATENT DOCUMENTS

| | | | |
|---|---|---|---|
| 2,167,389 | 7/1939 | Kuhn et al. | 219/239 |
| 3,134,884 | 5/1964 | Bean, Sr. | 219/233 |
| 3,691,342 | 9/1972 | Giles et al. | 219/229 |
| 3,703,624 | 11/1972 | Simsack | 219/229 |
| 4,086,465 | 4/1978 | Sylvester | 219/236 |
| 4,289,953 | 9/1981 | Scheu, Jr. | 219/238 |
| 4,431,903 | 2/1984 | Riccio | 219/238 |

FOREIGN PATENT DOCUMENTS

| | | | |
|---|---|---|---|
| 1128578 | 4/1962 | Fed. Rep. of Germany | 219/236 |
| 1165176 | 3/1964 | Fed. Rep. of Germany | 219/236 |
| 0505505 | 5/1939 | United Kingdom | 219/236 |
| 0633020 | 12/1949 | United Kingdom | 219/237 |
| 1251221 | 10/1971 | United Kingdom | 219/236 |

*Primary Examiner*—M. H. Paschall
*Attorney, Agent, or Firm*—Shlesinger & Myers

[57] ABSTRACT

Provided is a cartridge soldering iron having a hollow cylindrical handle, incorporating an internal coaxial socket assembly, a connection to a power supply, and a cartridge housing support, and a soldering tip bearing cartridge incorporating a tip, a heater assembly, a tubular housing and a coaxial socket assembly adapted to mate with the handle socket assembly in a wiping electrically conductive manner.

15 Claims, 2 Drawing Sheets

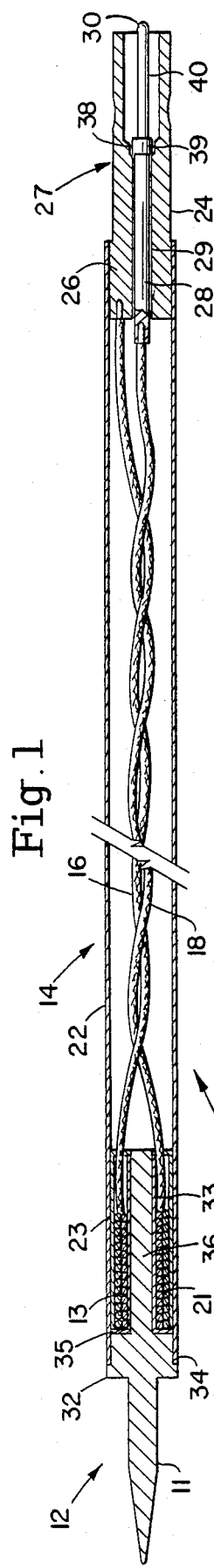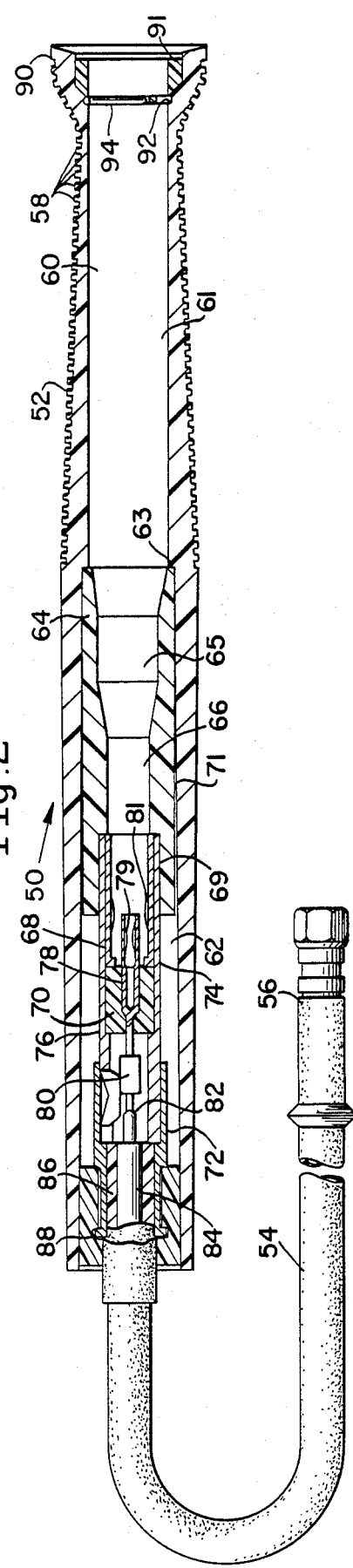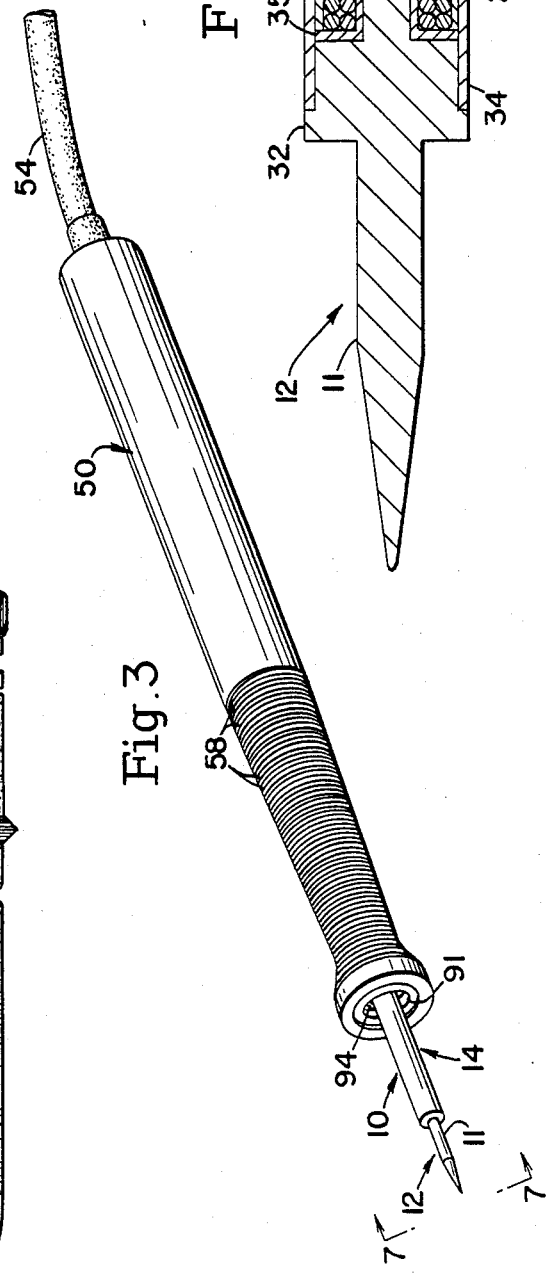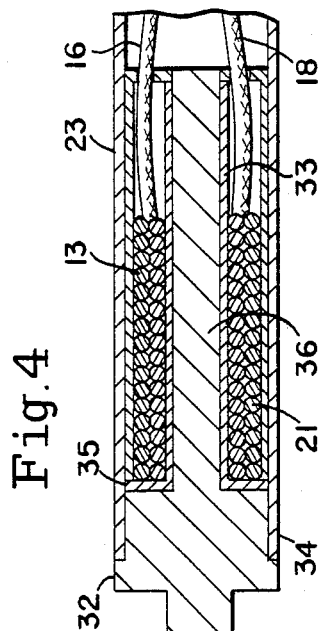
Fig. 1
Fig. 2
Fig. 3
Fig. 4

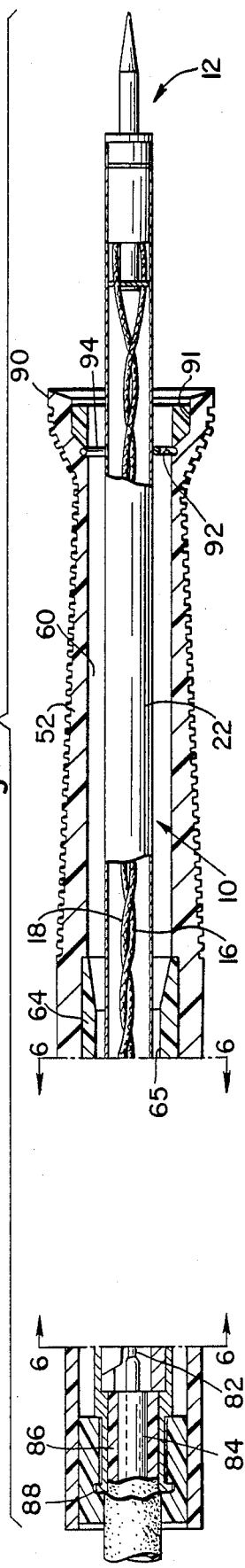
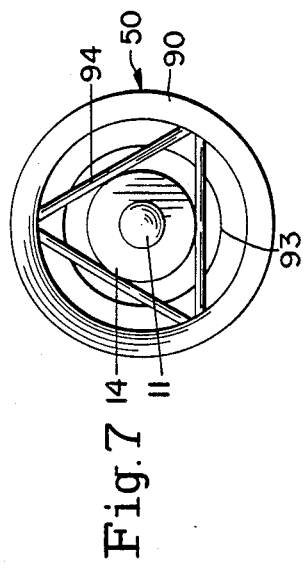
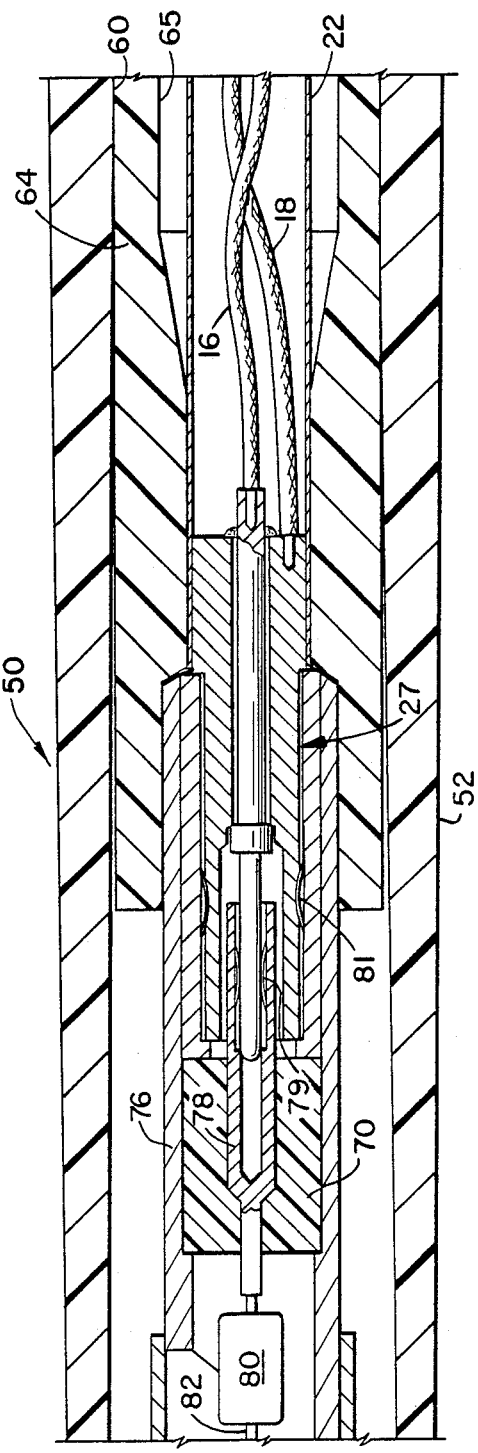

CARTRIDGE SOLDERING IRON

TECHNICAL FIELD

The present invention relates to soldering irons and, more particularly, to a replaceable cartridge tip soldering iron in which due to minimization of heat transfer between the cartridge and the cartridge holder, the user's fingers may be located quite close to the heater tip of the iron thus permitting precise movement of the tip.

BACKGROUND OF THE INVENTION

Soldering irons featuring replaceable tips are well known. A variety of tip configurations is desirable for different uses in the constantly evolving electronics industry. Replaceable tips afford greater flexibility to the user since, a tip, upon cooling, may be substituted for an alternative tip having a different geometric configuration permitting the user to work into tight regions, flat surfaces, etc.

Some problems associated with replacing tips in conventional soldering irons are notable. First, the time lag between operations is considerable; several minutes being required to cool a tip, replace it with another and heat the substitute tip; a major production inefficiency. Heat transfer from the tip/heater interface into the handle generally mandates the handle be separated by several inches from the tip in order to provide sufficient insulation therebetween. Additional problems result from corrosion which often freezes the tip in the handle or freezes the screw holding the tip. Such corrosion can be attributed to high temperatures at the interconnection between the tip and heater. Once such corrosion set in, the iron must be discarded since the tip cannot be extracted without destroying the iron.

Metallurgical based temperature autoregulation has been applied to soldering irons, see U.S. Pat. No. 4,256,945 and application Ser. No. 666,346 filed Oct. 30, 1984 now U.S. Pat. No. 4,745,264. Such autoregulation eliminates the need for external sensing and adjustment features. Temperature autoregulation restricts the tip operating temperature to a defined temperature and which facilitates precision soldering operations as well as minimizing thermal damage to the soldering iron and maximizing tip life. Thus, temperature autoregulating soldering irons are preferred to their conventional counterparts.

Nowhere has been found, however, a cartridge tip soldering iron which incorporates temperature autoregulation. Furthermore, a cartridge soldering iron permitting almost instantaneous exchange of tips has not been found. Lastly, conventional soldering iron design does not incorporate a structure for minimizing heat transfer between the tip and the handle, thereby permitting maximum tactile manipulation.

SUMMARY OF THE INVENTION

It is, therefore, an object of this invention to provide a cartridge-type soldering iron which permits interchangeability of the cartridges.

It is another object of this invention to provide a replaceable cartridge soldering iron which minimizes heat transfer between the heater tip and handle.

Still another object of this invention is to provide a cartridge soldering iron providing a temperature autoregulating heater which controls the tip temperature within a desired defined temperature range and which also permits the operating temperature to be changed by changing the tip.

Yet another object of this invention is to provide a soldering iron which permits holding the iron in close proximity to the tip and thus is more easily and precisely manipulated by the user.

Still another object of this invention is to provide reliable interchangeability of tips without undue delay for cooling and heating of the tip.

These and other advantages are satisfied by a soldering iron having a hollow, elongated handle connected to a power supply by a flexible coaxial cable and having an interior coaxial socket and a replaceable, tipped, heater cartridge, slidingly received within and supported by the handle and adapted to mate with the socket in an electrically conductive manner. The socket is located deep in the handle at a location remote from the heated end of the cartridge. The mating member on the cartridge is located remote from the heated end by a long, poor heat conducter. The cartridge is supported in the handle adjacent the heated end by a triangular array of thin flexible wire tangentially in contact with the cartridge to minimize the area of contact between the cartridge and wire.

Other objects are satisfied by the incorporation of an autoregulating heating means in the iron by means of which the operating temperature of the tip falls within a defined temperature range when connected to a constant current power supply.

Still other objects of the invention are satisfied by mating coaxial electrical connection between the cartridge and the handle where the connection includes low insertion force sockets and the cartridge is disposed within the handle in a manner to minimize heat transfer therebetween.

Essentially, the invention provides a unique soldering iron assembly comprising a tip, tip/heater, handle and mating, coaxial, electrical sockets.

Numerous advantages are provided by this invention. First, the arrangement of the handle and tip bearing heating cartridge facilitate immediate replacement of the cartridge. Second, the convertibility of differently configured tips is made possible Third, when metallurgically-based temperature autoregulation is featured, tips and cartridges having differing operating temperatures may easily be substituted. The advantages of these three features are further augmented by the remarkably short replacement time where, as little as seven seconds are required for achieving operating temperature of a newly installed tip bearing cartridge.

Other aspects of the invention are served by a cartridge and handle assembly having minimal heat transfer therebetween, and capable of securely seating the tipped cartridge in an electrically conductive and operative manner and providing a minimal distance (1.5 inches) between the tip and handle for more precise work.

Still other aspects of the invention are to incorporate a coaxial, low insertion force socket in the handle which mates with a coaxial socket assembly forming one end of the cartridge and to provide a high efficiency heater incorporated in the cartridge which is in direct contact with the tip. Therefore, the cartridge features both the tip and heater element at one end and reliable connection to the power supply, via the handle at the other end. The interior of the handle adjacent the heated end is large compared with the diameter of the cartridge, again to reduce heat transfer and to provide space for the wire support. At a location adjacent the socket in the handle, the interior is tapered inward to guide the cartridge connector element into alignment with the socket. By this arrangement heat transfer inefficiencies between the heater and tip as well as the cartridge and handle are minimized and the cartridge may be rapidly inserted.

These and other aspects of the invention will become apparent to the skilled artisan upon review of the following descriptions.

BRIEF DESCRIPTION OF THE DRAWINGS

FIG. 1 is a cutaway side view of the preferred embodiment of the cartridge assembly.

FIG. 2 is a cutaway side view of the preferred embodiment of the handle assembly.

FIG. 3 is a perspective view of a preferred embodiment of assembled invention.

FIG. 4 is a detailed view of the heater end of the cartridge.

FIG. 5 is a cross-sectional view of the cartridge inserted in the handle.

FIG. 6 is an enlarged view taken between arrows 6—6 of FIG. 5.

FIG. 7 is an end view along line 6—6 of FIG. 3.

DETAILED DESCRIPTION OF THE PREFERRED EMBODIMENT

Illustrated in FIG. 1 is cartridge assembly 10 including four major sections, tip 12, heating assembly 13, elongated housing assembly 14 and end coaxial pin connector 20. For the purpose of reference, tip 12 forms the distal cartridge portion and coaxial pin connector 20 comprises the proximal portion. In other words, as will become clear below, the soldering iron tip is the distalmost point of the invention and the power supply connector is the proximal-most.

Cartridge assembly 10 and especially heating assembly 13 are designed to function in accordance with the principles set forth in U.S. patent application Ser. No. 666,346, filed Oct. 30, 1984 and entitled High Efficiency Auto Regulating Heater. The subject matter of that application is incorporated herein by reference.

Tip 12 and assembly 13 embody virtually identical features found in the above-cited patent application. Conical, tapered tip 12 is constructed of a suitable, heat conductive material such as copper. Tip 12 is actually the distal extension of body 11 which is characterized by tip 12, circumferential shoulder 32, barrel member 35 adapted to seat within housing 14 and which has a smaller diameter than shoulder 32, and proximally extending rod 36. Rod 36 is covered with a thin layer 33 (0.006 inch for instance) of a conductive, high mu material such as Alloy 42 which is wrapped with highly insulative "Kapton" tape.

Housing 14 includes an elongated length of tubular stainless steel 22 (S.S. 304) which is a poor conductor of heat and has a low magnetic permeability. Shoulder 32 is adapted to abut the distal end of housing 22 while barrel member 35 seats within the end. Member 35 is preferably affixed to the interior cylindrical wall of housing 22 by press fitting. Tubular shield 23 lines the portion of the interior wall of housing 22 behind barrel member 35 and proximally extend a distance approximating the length of rod 36. Shield 23 is formed of a high mu (magnetic permeability) material such as Alloy 42. Spirally wrapped around a length of the distal end of rod 36 is a helix 21. Helix 21 is connected to a twisted pair of wires 16 and 18 all of which may be copper coated with a high temperature insulation such as a polyamide or ceramic Alternatively the helix 21, and if desired the wires 16 and 18, may be aluminum with aluminum oxide insulation. The helix is preferably a flat rectangular wire and if an aluminum oxide insulation is employed the need for Kapton tape is obviated. Projecting proximally from the helical coil, wires 16 and 18 are pigtailed and extend the entire length of housing 22 to coaxial pin connector 20. The wires 16 and 18 would typically be 26 gauge for a 35 watt iron.

Turning now to coaxial pin connector 20, it is a co-axial connector including outer cylindrical conductor 26 with central bore 29 to which wire 18 is connected, and inner, highly conductive pin member 30 to which wire 16 is connected. Pin member 30 is preferably plated with gold and the distal end, that secured within bore 29, is coated with a highly electrically insulative sheath 28. Pin 30 is co-axial and substantially colinear relative to outer connector 26 excepting that it extends beyond the distal edge thereof. Thus, pin 30 is protected by stronger outer connector 26.

The structural integrity of coaxial pin connector 20 may be enhanced by the following features: Outer conductor 26 includes a hollow cylindrical distal portion of slightly greater diameter than the proximal portion, where the diameter of distal portion corresponds to the interior diameter of tube 22 and may be press fitted therein. Pin 30 is further secured to bore 29 by press fitting and then potting 25 is applied at distal pigtail projection thereof and the distal face of outer connector 24. The proximal third of bore 29 flares outwardly to form larger annular portion 38 and still larger elongated socket portion 40. Preferably sheath 28, disposed around pin 30, incorporates ferrule features where enlarged annular member 39 corresponds to and fits within ring portion 38. Thus, pin 30 is prevented from translation in either direction along the central axis. This arrangement results in outer connector 24 being affixed to tubing 22 and pin 30 to be secured in an electrically insulative, coaxial manner within bore 29.

It is highly desirable in this invention to prevent heat transfer between tip 12 and coaxial pin connector 20. The use of wires 16 and 18 between the widely separated distal and proximal ends contributes greatly to the low heat transfer between the ends. By braiding wires 16 and 18, sufficient support is conveyed to the wires so the braid is suspended in air through housing 14. Moreover, as noted above, tube 22 is composed of minimally heat-conductive stainless steel. Thus, heat transfer to coaxial pin connector 20 is minimized.

However, the arrangement does provide for a complete electrical circuit when cartridge 10 is connected to a power supply. Current follows a path from pin 30, into wire 16, to heater assembly 13, back through wire 18 to outer connector 26.

Cartridge 10 incorporates temperature autoregulation features, which when combined with the belowdescribed handle assembly provides interchangeability for changing the tip configuration, the operating temperature of the soldering iron tip or facilitating maintenance. In view of the preference for a cartridge having temperature autoregulating features, the underlying concepts are now discussed.

In operation, voltage is applied across connector 26 and pin 30 to cause current to flow in the circuit. The magnetic field established by the current flowing through the helix 21 confines the current flowing in the high mu material 23 to follow a helical path thereby greatly increasing the length of the current path through the material 23.

In order to enhance the effect of the magnetic field on current flow in the elements 23 and tip assembly 11, an attempt is made to approach unity coupling between the helix 21 and the high mu sleeve 23. The coupling is enhanced by establishing the ratio of the width of each spiral of helix 21 to the spacing between each spiral and the high mu material 23 at, at least, and preferably greater than, four.

With a coupling approaching unity, the transformer equation for impedance reflected from the secondary into the primary winding is essentially valid. Thus, if helix 21 is provided with ten spirals while the mu material 23 constitutes a single spiral, the impedance of the mu metal is enhanced a hundredfold in the circuit.

The spacing between each of the spirals of helix 21 should be such as to define a capacitance between the spirals that results in a resonant frequency of the heater well above the frequency of a power source (the latter frequency may be as high as 20 MHz). The self capicitance is greatly enhanced by the spirals of the helix and in fact may be the largest contributor to capacitance due to the increase in $\Delta V$ across the turns.

Referring now to FIG. 2, there is illustrated handle assembly 50 predominately featuring elongated handle 52, coax cable 54 extending from the proximal end of handle 52, and conventional power supply connector 56.

Handle 52 is composed of a low density, low specific heat material such as "Nylon" and is designed to be held by the user as well as to provide electrical connection between cartridge 10 and, ultimately, the power supply. Moreover because cartridge 10 is seated in the handle, projecting distally therefrom, it is important to impart maximum heat insulation and dissipation characteristics thereto. In view of this purpose, the exterior of handle 52 incorporates annular ridges 58, a spiral, or the like, circumferentially disposed around and perpendicular to the axis of elongation of handle 52 and along its distal half. Ridges 58 increase the surface area of handle 52 thereby facilitating greater emission of heat radiation therefrom. Ridges 58 further serve to minimize the heat path between the cartridge and the users hand. It is the distal end of handle 52 which the user grips to conduct soldering operations because upon insertion of cartridge 20, the distance between projecting tip 12 and the user's hand is minimized. The configuration enhances targeting and directability of the tip as well as greater control of contact pressure.

Cylindrical bore 60 is co-extensive and coaxial with handle 50. Bore 60 incorporates two major sections, distal section 61 and proximal section 62. Proximal section 62 is of slightly greater diameter than distal section 61 and is adapted to slidingly receive cylindrical, internally tapering cartridge and handle locator 64 so that the distal edge thereof abuts shoulder 63 defined by the interface of regions 61 and 62.

Locator 64 is composed of highly thermal and electrical insulative material which has a low mu value such as Nylon or Delrin. Locator 64 includes an axially disposed cylindrical bore 65 of diminishing diameter and coaxial constant diameter region 66. Constant diameter region 66 is of slightly greater diameter than the smallest of the diameters of bore 65, interfacing therewith and forming proximately disposed shoulder 67. Locator 64 is secured to the proximal end of bore region 62 against shoulder 63 by an appropriate adhesive or other plastic bonding techniques. Thus its exterior cylindrical surface is affixed to and abuts the interior wall of handle 52 within region 62. Approximately 60%-75% of the outer surface of the locator 64 is of reduced diameter to provide an air space 71 between the locator and the handle 50 to reduce heat transfer between the two elements.

The connective relationship between locator 64 and handle 52 is identical to that between locator 64 and socket assembly 68. Assembly 68 includes elongated, hollow, cylindrical, electrically conductive member 70 which is mated with locator 64 in a co-axial manner by insertion and gluing the proximal end thereof in a region 69 of reduced diameter of the locator 66. The region 69 terminates at the shoulder 67 of the member 64. Hollow, cylindrical, coax, collar connector 72 surrounds and is affixed to member 70. It, too, is composed of highly conductive material. Collar connector 72 provides a means for securing the distal end of co-axial cable 54 to socket assembly 68. Member 70 and collar 72 project proximally from the back of locator 64 and are separated from the interior wall of handle 52 thereby leaving an annular airspace therearound. This feature is important to minimize heat transfer between socket assembly 68 and handle 52. An insulating plug may be inserted in the proximal end of the handle between members 52 and 72 to support the connector 68 and cable.

The interior electrically connective aspects of socket assembly 68 are now described. As noted above, member 70 is electrically conductive and further includes highly conductive, interior, annular, sleeve 74 disposed therein to form outer conductor 74. Insulator socket plug 76 is disposed within member 70, abutting the proximal edge of outer socket 74 and contains an axial bore which slidingly receives inner socket 78. Inner socket 78 projects co-axially into the interior of outer socket 74 and through insulator socket plug 76. It is further characterized by a cylindrical, electrically conductive element having a bore and electrically conductive compressible springs 79 projecting radially toward the bore axis. The springs provide wiping electrical contact with a corresponding pin member inserted therein. It should be noted that outer socket 74 may also incorporate spring members 81 similar to springs 79 in inner socket 78 thereby providing wiping electrical contact between the outer mating members of a coaxial connection.

Moving to the distal portion of socket assembly 68, inner socket 78 is electrically connected by solder to a lead of capacitor 80, which in turn has its proximal lead soldered to inner wire 82 of coaxial cable of coaxial cable 54. Exterior braided wire portion 84 of cable 54 is soldered to electrically conductive ferrule element 86 journelled within and in an electrically connective relationship with collar 72. The proximal portion of socket assembly 68 may be covered with high temperature, heat shrink sleeve 88. Conventional coax cable 54, of appropriate length and impedance includes proximally disposed conventional connector (SMC male in this case and alternatively may be a male F connector) which is plugged into an appropriate constant current power supply like that disclosed in the patent application entitled Constant Current Power Supply invented by Clappier and Smith, Ser. No. 684,730 and filed concurrently with this application, the subject matter of which is incorporated herein by reference.

Turning now to the distal end of handle assembly 50, it features annular, beveled collar 90 having a flared recess 91 at the proximal end of bore 60. Located directly behind collar 90, located in recess 91 and seated against shoulder 92 located at the proximal most portion of recess 91, is wireform support 94. Wireform 94 is adapted to support cartridge 10 within handle assembly 50 in a manner to prevent cartridge 10 from directly contacting handle 52 and to provide strain relief for the socket interconnection. It is preferable that wireform support 94 be relatively heat and electrically non-conductive, have a low mu value, and be of a geometric configuration to minimize heat transfer between the cartridge assembly and handle. As illustrated more clearly in FIG. 5, wireform 94 preferably forms an equilateral triangle incorporating one discontinuity and having three, the minimal number, contact points in recess 92, and three contact points with the cartridge. The wireform is preferably composed of stainless steel 304 or an alloy thereof with 10% copper. Furthermore, it is preferred that wireform 94 comprise a springy material, includes a gap and is of a size such that the cartridge contact points generate an inwardly directed force. Thus, the distance from the midpoint of the legs to the central triangle point should be slightly less than the radius of cartridge 10. It is noted that the circumferential surfaces of the cartridge and the wire of the wireform contact at triangular points tangentially so that surface contact is minimized to minimize heat transfer. The wireform 94 is retained in recess 91 by an annular collar 93 of heat insulating material.

Referring now to FIGS. 3 and 4, the assembled soldering iron, cartridge assembly 10 is removably secured in handle assembly 50 in the following manner. Cartridge socket assembly 24 is passed into wireform 94 which distorts slightly, through bore portion 61 and into locator 64 which guides the cartridge to the center of the socket assembly. Outer conductor 26 is slidingly received into and mated with outer conductor 74 of socket assembly 68. As socket assembly 24 is moved toward the proximal end of assembly 68, pin 30 passes into inner socket 78, depressing springs 79 and making wiping electrical contact therewith until the tail portion of pin 30 is fully mated with the inner socket. Springs 81 are depressed by the outer surface 26 of connector 24 and provide cleaning by a wiping action. Wireform 94 is fully engaged with the proximal end of cartridge housing 14, supporting it in a substantially co-axial and coextensive manner within bore 60 and further providing an insulative airspace therearound. Heater assembly 13 and tip 12 both project from the proximal end of handle 52. Minimal heat transfer between the cartridge and handle is therefore achieved as well as providing support and an electrically connective relationship between cartridge 10 and handle assembly 50. The electrical circuit between handle assembly 50 and cartridge assembly 10 travels the following path. Current passes through central coax wire 82 from the power supply, through capacitor 80 into inner socket 78 and pin 30. The pathway through cartridge assembly 10 already described, returns the current to socket 24. Upon return through outer socket 24, the current passes into mating outer socket 74, through conductive members 70 and 72 and ferrule element 86, into outer, coax, braided wire 84 and finally back to the power supply.

As can be readily appreciated, the above-described preferred embodiment minimizes corrosion of the mating coaxial socket assemblies because the heater unit is remotely spaced therefrom. The arrangement further minimizes heat transfer between the tip and socket members thereby markedly reducing the corrosive effect of heat on the assembly which prevents corrosive binding.

Cartridge assembly 10 and handle assembly 50 involve transformer action which when coupled with the elongated path induced in the high mu material, greatly increases the impedance of the heater. In order to match the load ohms of the source (e.g. 50 ohms) an impedance matching circuit is employed. The details of various such circuits are found in the aforesaid patent.

The above-described apparatus provides for easy convertability of different cartridge assemblies and therefor soldering tips. Different cartridges may include different features such as known tip configurations or distinct autoregulating operating temperatures. Moreover, the configuration of the assembled components permits close and precise manipulation because of the proximity of the user's fingers to the tip, a distance of approximately 1¼".

These aspects and embodiments as well as modifications thereof should now be readily apparent to the skilled artisan or rendered apparent without undue experimentation and are, therefore, intended to fall within the scope of the invention as defined by the following claims.

I claim:
1. A heater structure comprising
   a cartridge having a low heat conductive tube, a heat generating means including a coil permanently fixed in one end of the tube, and
   a first electrical connector permanently fixed in the other end of the tube, and
   an elongated, hollow holder of non-heat conducting material having first and second ends,
   a second electrical connector located adjacent one end of said holder and adapted to couple with, mechanically support and removably retain said cartridge in said holder and apply electricity to said first connector,
   first means for laterally supporting said cartridge located adjacent the other end of said holder and substantially isolating said holder from the heat of said heat generating means.

2. A heater structure according to claim 1 further comprising
   means in said holder for guiding said first connector into direct engagement with said second connector whereby said first connector may be rapidly slid into and out of engagement with said second connector.

3. A heater structure according to claim 1 wherein said heater structure is a soldering iron cartridge and said heat generating means is disposed about a rearward projection of a soldering iron tip.

4. A soldering iron according to claim 1 or claim 2 wherein said connectors are a mating pair of coaxial connectors.

5. A soldering iron according to claim 4 further comprising
   means for supporting said second connector at said one end of said holder,
   said means for supporting said second connector providing a low heat and electrically conductive region lying between said second connector and said holder.

6. A heater structure according to claim 3 wherein
a ferromagnetic material is disposed on said rearward extension,
a coil is disposed about, insulated from and magnetically coupled to said ferromagnetic material, and
means for connecting said coil to an a.c. source of constant current.

7. A heater structure comprising
a cartridge having a heat generating tip member located adjacent one end of said cartridge,
a first connector located at the other end of said cartridge,
a low heat conducting tube extending between and supporting both the heat generating means and said first connector,
an elongated, hollow cartridge holder of low heat conducting material and having a first and second end,
a second electrical connector located adjacent said first end of said holder and adapted to receive and removably support said first connector,
said cartridge extending through said second end and an intermediate region of said holder with said first connector seated in said second connector,
the cartridge and holder having dimensions such that air space exists therebetween except in the region of said connectors, and
slip fit means for solely supporting said cartridge adjacent said second end of said holder.

8. A soldering iron according to claim 1 or 4 or 7 wherein said means for supporting comprises
a plurality of lengths of thin, elongated wire defining an opening therebetween at the other end of said handle,
said wires having their elongated axes lying perpendicular to the elongated axis of said tube and defining an opening between said wires to accommodate said tube with said wires and said tube contacting essentially tangentially.

9. A soldering iron according to claim 8 wherein
said wires define a triangular opening therebetween whereby to provide a three point tangential contact with said cartridge,
said wires being of a springy, material.

10. A soldering iron according to claim 8 wherein
said heat generating means is located outwardly of said second end of said holder.

11. A combination including
a heater cartridge, and
a handle for said heater cartridge,
said heater cartridge comprising a low heat conducting tube, a heat generating means substantially permanently fixed in one end of the tube, and
a first electrical connector substantially permanently fixed in the other end of the tube,
said handle comprising an elongated, hollow holder of non-heat conducting material having first and second ends,
a second electrical connector located adjacent one end of said holder and adapted to couple with, mechanically support and removably retain said cartridge in said holder and apply electricity to said first connector,
first means for laterally supporting said cartridge located adjacent the other end of said holder and substantially isolating said holder from the heat of said heat generating means, and
coil means of electrically conductive material located within a member of said combination so as to efficiently couple magnetic flux to said ferromagnetic material whereby to heat said ferromagnetic material to a temperature approaching its Curie temperature upon said coil being connected across a source of constant current.

12. An article of commerce comprising
a heater cartridge comprising
a hollow, straight, low heat conducting tube having open ends,
one element of a slip fit coaxial electrical connector permanently secured in one end of said tube,
a heater member located within and permanently secured in the other end of the tube,
electrically conductive means extending between said connector and said heater member whereby upon said connector being coupled to a source of electrical energy said heater member produces heat.

13. A heater cartridge according to claim 12 wherein said heater member comprises
a heat conductive member having a tip extending outwardly from said tube and an integral rod press-fitted within said tube.

14. A heater cartridge according to claim 12 or claim 13 wherein
said coaxial connector is a male connector having an outer sleeve secured in said tube with a male member extending centrally of said sleeve.

15. A heater cartridge according to claim 12 wherein said tube is a stainless steel low heat conductive electrically conductive tube.

* * * * *

UNITED STATES PATENT AND TRADEMARK OFFICE
CERTIFICATE OF CORRECTION

PATENT NO. : 4,839,501
DATED : June 13, 1989
INVENTOR(S) : Mark J. COWELL

It is certified that error appears in the above-identified patent and that said Letters Patent is hereby corrected as shown below:

On the title page,

After item 22 on the face of the patent, please insert the following:

--Related U.S. Application Data

[63] Continuation-In-Part of Application No. 684,731, filed December 21, 1984--.

Signed and Sealed this

Twenty-seventh Day of February, 2001

Attest:

NICHOLAS P. GODICI

Attesting Officer

Acting Director of the United States Patent and Trademark Office